United States Patent [19]
Talley, Jr.

[11] 3,882,025
[45] May 6, 1975

[54] WASTEWATER CONCENTRATOR WITH SLOTTED DISTRIBUTOR

[75] Inventor: Walter J. Talley, Jr., Brentwood Park, Calif.

[73] Assignee: Sweco, Inc., Los Angeles, Calif.

[22] Filed: June 16, 1972

[21] Appl. No.: 263,540

[52] U.S. Cl. ............... 210/354; 210/304; 210/377
[51] Int. Cl. ........................................... B01d 33/06
[58] Field of Search ............ 210/78, 377, 380, 512, 210/304, 354, 213, 214; 209/254, 270, 303, 234

[56] References Cited
UNITED STATES PATENTS

| | | | |
|---|---|---|---|
| 387,801 | 8/1888 | Muller | 210/354 |
| 1,395,193 | 10/1921 | Lindenberg | 210/377 X |
| 2,608,952 | 9/1952 | Herbert | 210/354 X |
| 3,448,858 | 6/1969 | Delcellier et al. | 210/354 X |
| 3,627,130 | 12/1971 | Talley, Jr. et al. | 210/377 |

*Primary Examiner*—Charles N. Hart
*Assistant Examiner*—Robert H. Spitzer
*Attorney, Agent, or Firm*—Lyon & Lyon

[57] ABSTRACT

There is disclosed herein apparatus for screening combined liquids-solids such as wastewater. Exemplary equipment includes a substantially cylindrical screening structure which is mounted for rotation and a slotted distributor disposed therein. Influent is piped into the distributor and flows through slots in the peripherial wall thereof toward the inner surface of the screening structure. The flow of influent from the distributor onto the screening structure causes the screening structure to rotate, and the influent is screened thereby.

4 Claims, 8 Drawing Figures

WASTEWATER CONCENTRATOR WITH SLOTTED DISTRIBUTOR

CROSS-REFERENCE TO RELATED APPLICATIONS

The concepts disclosed herein are directly related to those disclosed in applicant's co-pending application Ser. No. 126,080 entitled "Wastewater Concentrator with Plural Distributors" filed Mar. 19, 1971, now U.S. Pat. No. 3,707,235, and applicant's co-pending application Ser. No. 211,763 entitled "Improved Wastewater Concentrator" filed Dec. 23, 1971, now U.S. Pat. No. 3,727,768, (a continuation of Ser. No. 42,165 filed June 1, 1970), the disclosures of which are incorporated herein by reference. These copending applications disclose wastewater concentrators constructed and operated similar to that disclosed herein; however, the present concepts involve use of a new form of slotted distributor in the wastewater concentrator resulting in an apparatus having advantages over those disclosed in said copending applications.

The concepts disclosed herein also are related to those disclosed in U.S. Pat. No. 3,539,008 entitled "Screening Apparatus Employing Rotating Cylindrical Screen and Stationary Feed Means" and U.S. Pat. No. 3,511,373, both of which are assiged to the assignee of the present application and the disclosures of which are incorporated herein by reference. Briefly, said U.S. Pat. No. 3,539,008 discloses apparatus involving a rotating substantially cylindrical screen in combination with a stationary distribution means for screening an influent. The screen and distribution means may be used in combination with a downstream planar vibratory separator for further screening of the concentrate from the rotating screen. Said U.S. Pat. No. 3,511,373 discloses apparatus similar to that of the foregoing patent and is directed to means for facilitating cleaning of said rotating screen. Reference is also made to the following related patents: U.S. Pat. No. 3,737,038 entitled "Up-Flow Separator" filed in the name of Theodore R. Westfall, June 3, 1971 (which is a continuation-in-part of Ser. No. 42,098 filed June 1, 1970, now abandoned); U.S. Pat. No. 3,743,094 entitled "Improved Rotating Screen Separator," filed in the name of Philip H. Mook Dec. 20, 1971, (which is a continuation of Ser. No. 42,099 filed June 1, 1970, now abandoned); and U.S. Pat. No. 3,627,130 entitled, "Wastewater Concentrator Method." These applications contain a similar disclosure to that set forth in U.S. Pat. No. 3,727,768 but include claims directed to various of the structural and operational features disclosed therein.

BACKGROUND OF THE INVENTION

This invention relates to the screening of a flowable influent to achieve a desired separation of constituants of the influent and particularly to the screening of a liquid-solids influent such as to achieve a desired separation of liquids and solids. The present concepts are particularly useful in the screening of industrial wastewater, storm water overflow from combined sewer systems and the like.

Although the present inventive concepts are useful in screening various materials, they have particular application for water pollution control and, thus, will be described in the environment of fine-mesh screening of a liquid-solids influent.

Reference may be made to said U.S. Pat. No. 3,707,235 which discusses problems of screening and treatment of storm water overflow, and the like.

The present application relates to a wastewater concentrator having certain advantages over the apparatus disclosed in said aforementioned applications and patents and includes improvements thereover. Briefly, the present application is directed to a wastewater concentrator similar to that disclosed in said U.S. Pat. Nos. 3,707,235 and 3,727,768 but involves the use of a slotted distributor rather than the type of distribution means disclosed in said applications. Influent is fed into this new distributor, and influent flows outwardly therefrom through peripheral openings of slots therein as substantially discrete flows. A substantially cylindrical screening structure is disposed about the distributor, and the distributor is stationary and the screening structure is mounted for free rotation generally about the axis of the distributor. The force of the influent streams flowing from the slotted distributor causes rotation of the screening structure, and the screening structure screens the influent into an effluent and a concentrate. This arrangement is contrasted to the arrangement of said U.S. Pat. No. 3,707,235, for example, which employs a different form of distributor construction involving a plurality of inclined plates, and use of rotary power source for driving the screening structure. The arrangement of the present invention provides several advantages among which are simplification in construction and reduction in cost of the distributor structure, and possible elimination of a drive system for the screening structure.

In light of the foregoing, it is a principal object of the present invention to provide improved screening apparatus.

A further object of this invention is to provide a screening device employing an improved distribution means.

An additional object of this invention is to provide an improved screening apparatus employing a screening device and a slotted distributor disposed therein for feeding flows of influent to said screening device.

Other objects and features of the present invention will become apparent through a consideration of the following description and drawings.

SUMMARY OF THE INVENTION

There is disclosed herein a screening apparatus useful for screening of a liquid-solids influent, such as storm water overflow from sewer systems, comprising a substantially cylindrical screening device mounted for rotation within a housing, a slotted distributor for receiving a feed of influent and directing the influent toward the inner surface of the screen as a plurality of influent streams, and outlet means for receiving the effluent which passes through the screen and the concentrate which does not pass through the screen.

The screening structure may comprise a substantially cylindrical screening structure including screen panels therein, and the screening structure is suitably supported and journalled in one or more bearing structures for rotation. The distributor likewise may be substantially cylindrical, toroidal or other suitable shape, and is stationarily mounted within the screening structure. The top and bottom of the distributor are closed, and the feed means may include a feed pipe, or the like, for supplying the influent into the distributor. The influent passes through slots or openings in the peripheral wall of the distributor and the influent impinges on the inner surface of the screen panels preferably as a series of substantially discrete flows or streams of influent. The screening structure and distributor are mounted within a housing, and suitable collection means are provided for receiving the effluent and the concentrate.

The screening structure preferably is in the form of a substantially cylindrical cage and includes a plurality of screen panels, which may be removed for repair, cleaning or replacement with different mesh screens or different screen cloth. The screen panels are preferably square and arranged in two rows within the screen cage. The use of square panels allows the same to be removed and repositioned, after rotation of the panel by 90°, 180° or 270° for equalization of screen wear and thus increased screen life.

The rate of flow and volume of influent into and from the distributor, and the angle of the flows of influent from the slots on the distributor, may be adjusted to provide a desired rotational speed for the screening structure and a desired centrifugal force, or g-loading of influent on the screen, the g-loading being a function of the radius of the screen and the square of the rpm thereof. A preferable g-loading is approximately in a range of 1 to 5 g's, and preferably about 3 to 4 g's, but this range may vary upwardly and downwardly by several g's. The velocity of flow of influent onto the screen preferably is adjusted to be within a range below which sufficient flow toward the screen does not occur and above which screen damage and splashback possibly may occur.

A test unit was constructed, for example, having a screening structure with a diameter of approximately 12 inches and approximately 16 inches tall, and a distributor in the form of a closed cylinder of slightly less diameter and approximately 12 inches tall. The distributor had two rows of slots, each row including four evenly spaced slots, the slots of one row being offset approximately 45° from the slots of the other row. Each of the slots was approximately 5½ inches tall (in the axial direction), and approximately one-half inch wide (in the circumferential direction), but the width of these slots was variable by means of cover plates thereon. With the slots adjusted to be approximately one-eighth inch wide, and with for example an influent feed of 179 gallons per minute of 250 ppm paper pulp solution, a screen speed of approximately 150 rpm resulted. Approximately 4.9 gallons per minute of concentrate was obtained, and this equates to a 2.7% concentrate thereby giving a liquid-solids split of approximately 97 to 3. It is to be understood that this particular construction (distributor diameter, number and size of slots, and so forth) and the influent feed rates are exemplary, and that substantial changes can be made in these variables without departing from the concepts of the present invention. In many instances, the influent preferably is screened to achieve a sufficiently fluid concentrate, as distinguished from a dry concentrate, so that the same may be readily transported through pipes of the like or pumped for further treatment or disposal.

The screen cleaning apparatus may be provided for spraying cleaning fluid through the screen at desired intervals as described in said application Ser. No. 42,165.

DESCRIPTION OF THE PREFERRED EMBODIMENTS

Figure 1:
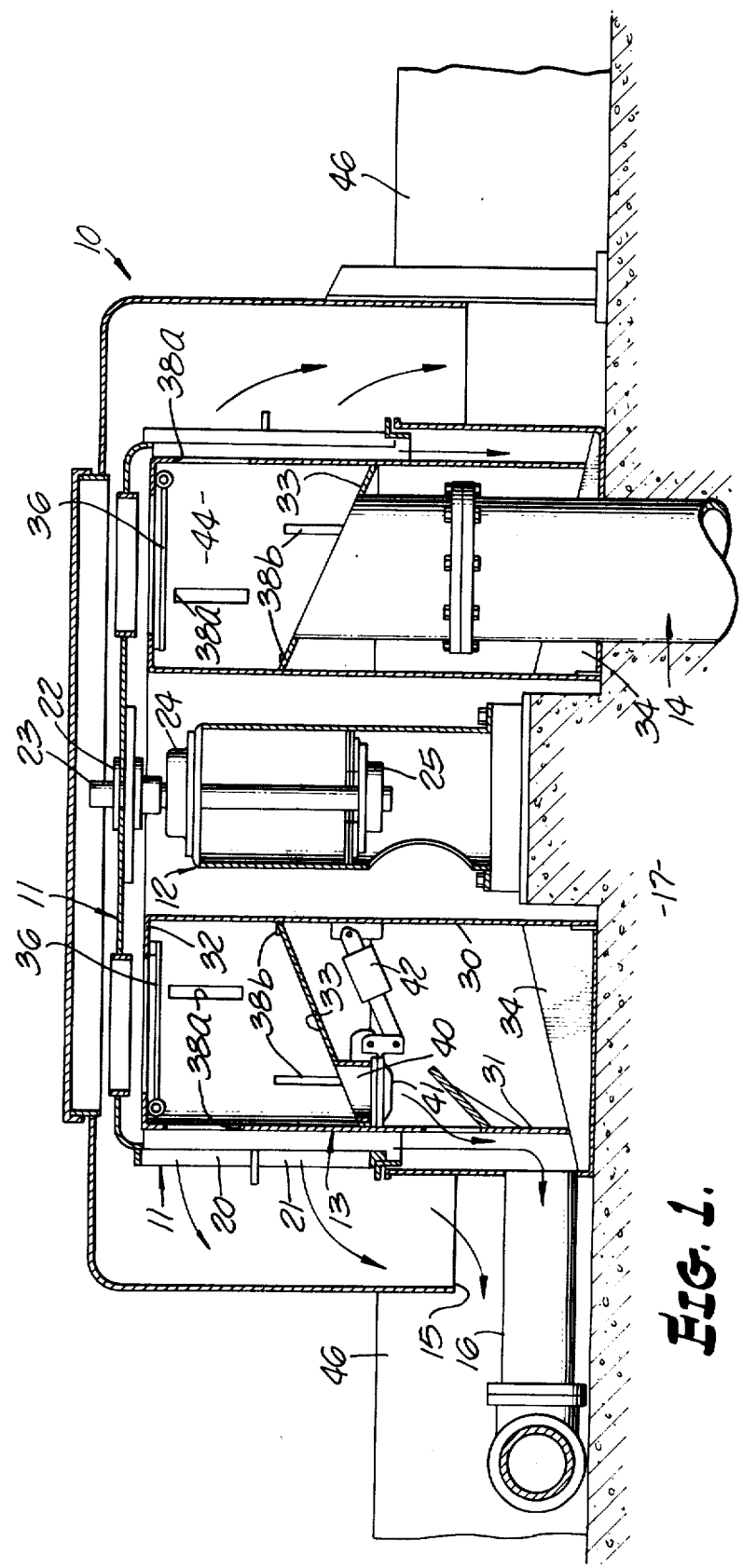
FIG. 1 is a simplified cross-sectional elevational view of a screening apparatus according to the present invention.

Turning now to the drawings, and first to FIG. 1, a screening apparatus according to the present invention is illustrated and includes an outer substantially cylindrical housing 10 enclosing a screening device or cage 11 mounted for rotation on a pedestal 12, a stationary distributor 13 mounted within the screen cage 11, and an influent feed pipe 14 connected to supply influent into the distributor 13. The apparatus also includes an effluent outlet 15 and a concentrate outlet pipe 16. The entire apparatus may be mounted on a concrete slab 17.

Figure 4:
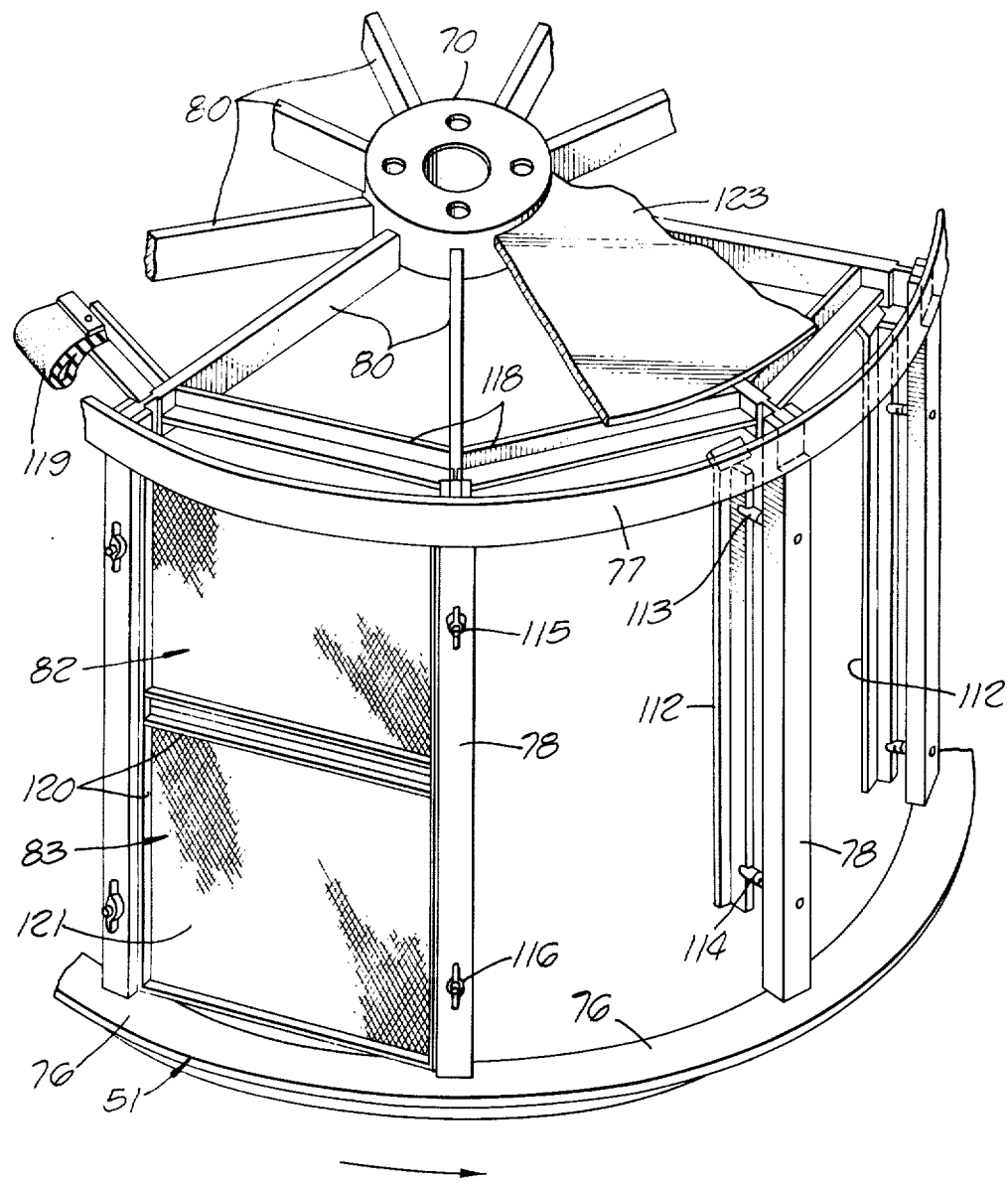
FIG. 4 is a partial perspective view of a screen cage for the apparatus of FIG. 1 or FIG. 2.

The screening device 11 preferably is in the form of a cage containing removable screen panels 20 and 21. The screen cage and panels may be constructed as illustrated in FIG. 4 which will be described subsequently. The cage 11 is coupled at 22 to a vertical shaft 23, and the shaft 23 is journalled in bearing assemblies 24 and 25 secured to the pedestal 12 which in turn is affixed to the concrete slab 17. This arrangement allows the screen cage 11 to rotate freely about the axis of the shaft 23, although a motor and drive (not shown) can be used to maintain the screen cage at a desired speed. The pedestal arrangement illustrated in FIG. 1 allows a relatively heavy double bearing to be employed for supporting the screen cage 11, and also allows different feed arrangements than that shown at 14 if desired.

The distributor 13 is formed of an inner cylindrical wall 30, an outer cylindrical wall 31, an annular top 32, and an inclined bottom 33. The outer periphery of the distributor 13 typically may be spaced, for example, approximately one-half inch from the screen panels 20 and 21. The device may be strengthened by gussets 34 and secured to the concrete slab 17. The influent feed pipe 14 extends upwardly as shown in FIG. 1 and is suitably coupled with and secured to the bottom 33 of the distributor 13 as by welding. Manholes or hatches 36 may be provided in the top 32 of the distributor 13 for allowing access to the distributor for cleaning. The screen cage 11 and housing 10 also may include suitable openings and covers for providing access to the hatches 36. The outer wall 31 of the distributor 13 includes a plurality of slots generally as indicated at 38. These slots are elongated in a vertical direction, and may be arranged in an upper row of slots 38b essentially aligned with the respective screen panels 20 and 21. The number of slots provided may vary, as can their length and width, depending on the size of the screening device. Typically, for a 30-inch device (nominal screen diameter) eight evenly spaced upper slots 38a and eight evenly spaced lower slots 38b may be used, but with the lower slots 38b offset 22½° circumferentially from the upper slots 38a.

With the present distributor construction, large particles will be held in the distributor 13 and cannot flow through the slots 38 and damage the screening structure. The bottom 33 of the distributor 13 may have an outlet 40 with a gate valve or plug 41 thereon remotely operated by a hydraulic cylinder 42 for facilitating dumping of large particles, such as rocks and sticks which become stuck in the distributor 13. Such objects can be dumped and combined with the concentrate flowing from the concentrate outlet 16.

In operation of the present device, influent is fed by the influent pipe 14 in to the toroidal interior 44 of the distributor 13. This influent flows from the slots 38 toward the inner surface of the screen panels 20-21 of the screening structure 11. This results in the influent being formed into a plurality of substantially discrete streams flowing from the slots 38, and the energy of these streams causes the screening structure 11 to rotate. These streams leave the slots 38 at an angle somewhere generally between a radial line through the distributor and a line tangential thereto. As will be described subsequently, adjustable covers in the form of flat or angled plates may be disposed at each of the openings 38 to allow adjustment of the effective size of the openings as well as the angle of the influent streams as they leave these openings. The rate of feed of influent, width (circumferentially or tangentially) of the slots 38 and nature of the sliding cover (flat plate or angled) affect both the angle of the flow of influent from the openings and the speed of the screen cage 11 and thus the g-loading of influent streams on the screen. The rate of flow of influent from the distributor slots is a function of the rate of feed of influent to the distributor, the size of the influent feedpipe 14, as well as the head of influent involved which in turn is provided by the relative height of the supply of influent, or pump capacity where a pump is used for supplying the influent.

A distributor structure 13 is described herein includes sufficient internal influent capacity for cushioning the initial force when the feed of influent is commenced. Thus, any initial blast of influent streams onto the inner surface of the screening structure which could in turn tend to damage the same is minimized. Furthermore, with the present arrangement, the streams of influent impinge upon the inner surface of the screen panels 20 and 21 relatively gently and there appears to be insignificant splashback (e.g., 1 gpm as compared to 60 gpm on prior apparatus) from the inner surface of these screens, thereby improving both screen life and concentrate/effluent split. It has been found that this arrangement results in less blinding of the screens, and a drier concentrate results.

Although varying the size of the openings 38 changes the speed of the screening structure 11, slots widths of, for example, one-eighth inch appear to be quite suitable for a unit involving a distributor having an outer diameter of approximately 30 inches, and generally it does not appear that such openings need be over approximately one-half inch wide. Instead of the openings 38 being vertical as illustrated in FIG. 1 they may be inclined at a slight angle to the vertical so as to provide inclined flows of influent toward the screen panels 20-21 to provide a wiping and cleaning action in the manner more fully discussed in said application Ser. No. 210,179 in the name of Philip H. Mook. The distributor 13 need not be a toroid as shown in FIG. 1 or a full cylinder as illustrated in FIG. 2 but may be a segment of a toroid for example.

Both the screening structure and distributor may be cleaned by providing a backspray therethrough. At the end of a run, the feed of influent can be terminated and the cleaning operation performed. It has been found that the screen cage 11 will rotate for a sufficient period of time after the flow of influent has been terminated to allow backspray cleaning thereof. After the backspray operation, the gate 41 on the distributor 13 can be opened, and large materials allowed to flow out. The manholes 36 enable large chunks of material which become lodged in the distributor 13 to be removed manually.

In an exemplary application, a battery of units as illustrated in FIG. 1 may be provided with the effluent being directly discharged from the outlet 15 into a concrete channel 46. The concentrate flows from the apparatus continuously. The units are generally operated until the concentrate reaches a given percentage, and then are cycled off and cleaned. In an installation of this nature, no electrical power is required inasmuch as it is not necessary to provide a rotary power source for driving the screening structure 11.

Figure 2:
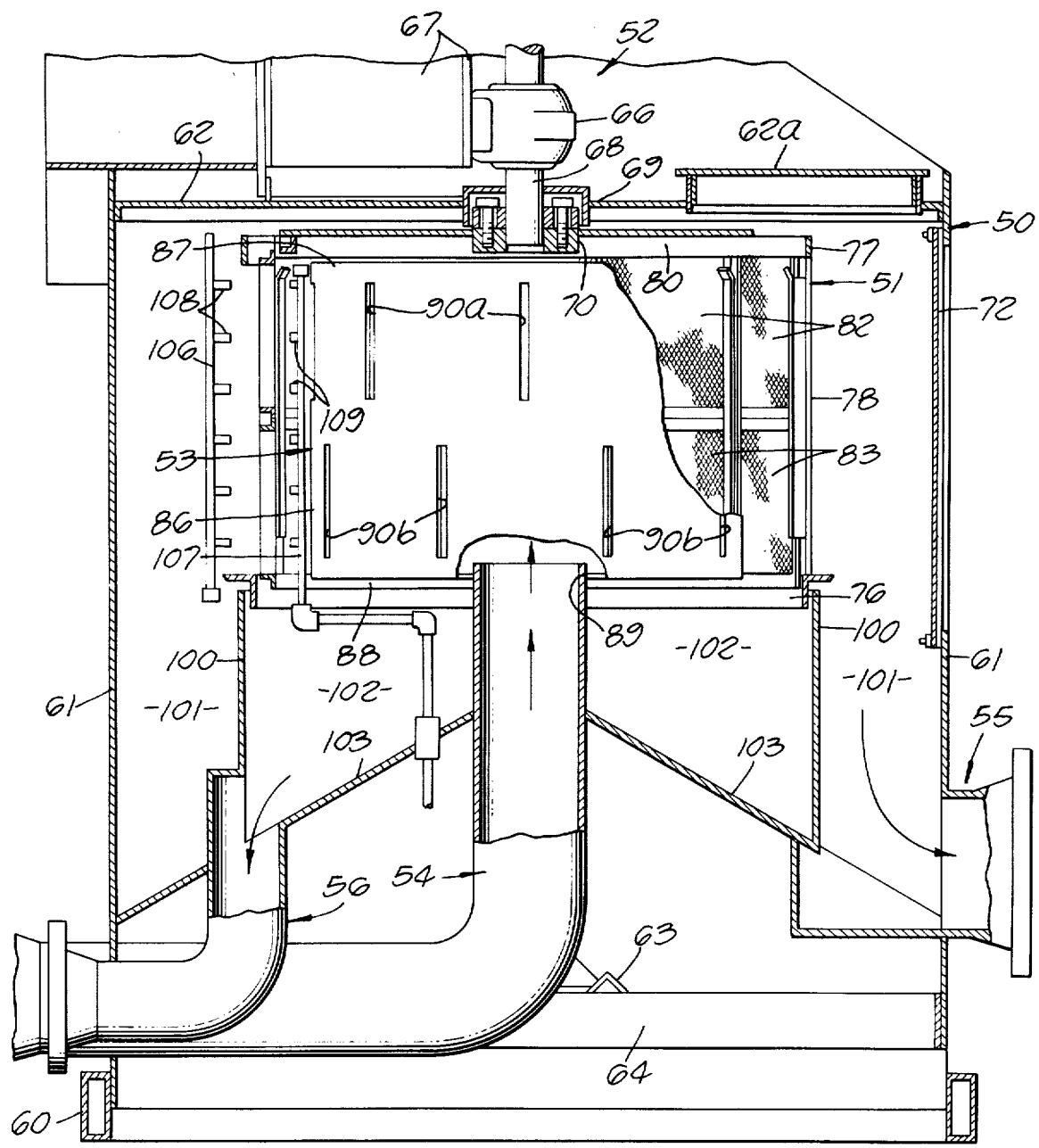
FIG. 2 is a more detailed cross-sectional elevational view of an alternative screening apparatus according to the present invention.

Turning now to FIG. 2, a screening device is illustrated therein quite similar in basic construction to that described and illustrated in said applications Ser. No. 211,763 and Ser. No. 126,080. However, instead of including one or more distributors having a plurality of radially extending and inclined plates as described in said applications, FIG. 2 illustrates a distributor according to the present concepts, and shows how the present distributor can be incorporated into such prior apparatus with minimal modification. The apparatus of FIG. 2 includes a housing 50, screening structure 51 which may be identical to that of FIG. 1, support 52 for mounting the screening structure 51 for rotation, distributor 53, and influent feed pipe 54. Also provided is an effluent outlet 55 and a concentrate outlet 56. The housing 50 includes a base 60, a substantially cylindrical upstanding wall 61, and a top cover 62 to provide a substantially closed container. Suitable bracing is provided within the housing 50 for structural purposes and for firmly supporting the various pipes. For example, an angle bracket 63 and braces 64 are provided as illustrated in FIG. 2 to secure the various components within the housing 50.

Ths support 52 for the screen cage 51 includes a bearing assembly 66 secured by mounting plates 67 or the like to the housing 50, and a shaft 68 journalled in the bearing assembly 66. The shaft 68 has a collar 69 secured thereto, as by welding. A central collar 72 affixed to the screen cage 51 is bolted to the collar 69 to support the screen cage 51 for rotation in the bearing assembly 66. The support assembly 52 may be enclosed within a removable top cover (not shown) if desired. The top cover 62 noted earlier may be a lift off cover, or a portion 62a thereof may be removable, to enable access to the interior of the apparatus if desired. The wall 61 of the housing 50 may include a window 72 for observation of the interior of the apparatus.

The screen cage 51 will be described in more detail subsequently in reference to FIG. 4, but generally includes a cage formed of a lower angle ring 76, an upper bar ring, 77, and a plurality of upstanding bars 78 extending between the angle ring 76 and bar ring 77. Eighteen bars 78 have been used for an exemplary cage approximately 60 inches in diameter, while nine such bars have been used on a 30-inch diameter cage but having a single row of screen panels. Support ribs 80 are connected between the various bars 78 and the central collar 70 which is secured to the collar 69 affixed to the shaft 68 as noted earlier. Removable screen panels 82 and 83, like panels 20 and 21 of FIG. 1, having a frame and screening material of metal or cloth secured thereto are inserted in two rows between the vertical bars 78 and clamped thereto in a substantially sealed relationship. If only one row of screen panels is used, they are clamped in a similar manner. As with the apparatus of FIG. 1, the periphery of the distributor 53 may be spaced, for example, approximately 1 to 1½ inches from the screen panels 82 and 83.

Figure 3A:
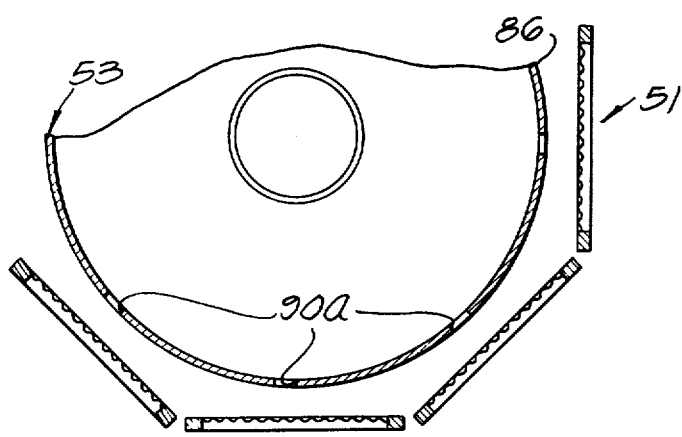
FIGS. 3a–3e illustrate an exemplary distributor, and components thereof, of the present invention.
Figure 3B:
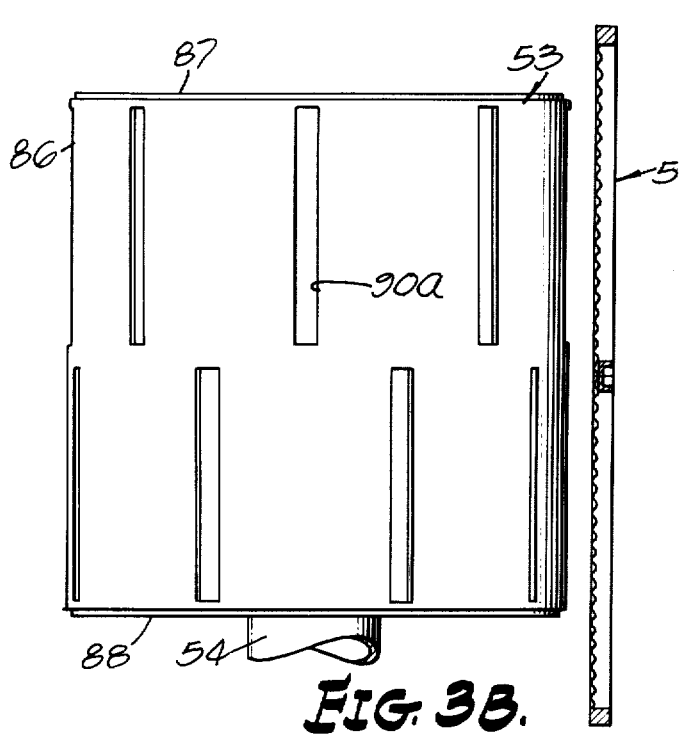
Figure 3D:
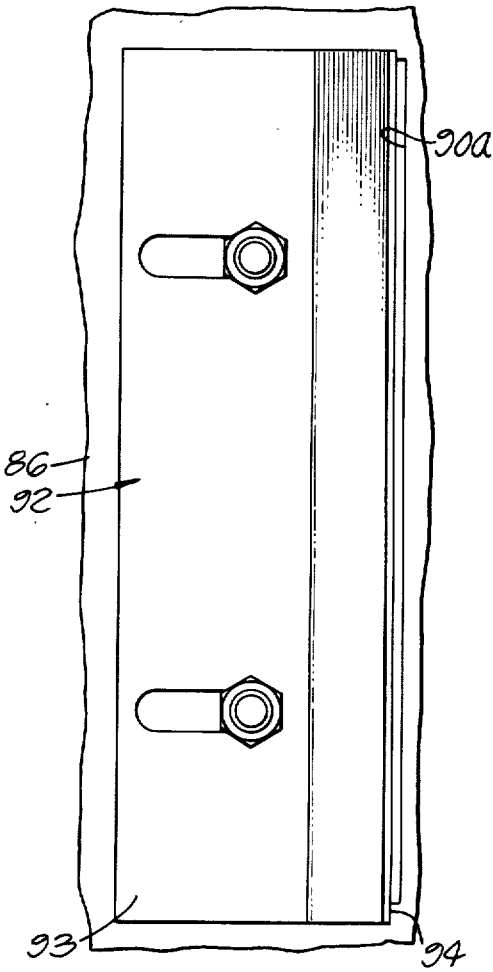
Figures 3C, 3E:
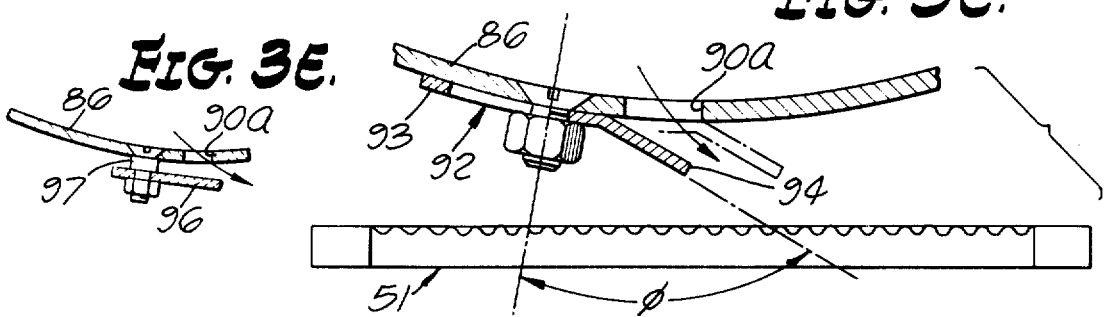

The distributor 53 includes a cylindrical outer wall 86, a top 87, and a bottom 88 forming an integral enclosed unit which can withstand the pressure of the incoming influent. The bottom 88 includes an opening 89, and the upper end of the influent feed pipe 54 is connected thereto, as by welding. Also, an exemplary distributor 53 of about 30 inches in diameter includes an upper row of eight evenly spaced vertically elongated slots 90a, and a similar lower row of eight slots 90b but which are offset by a radial angle from the slots 90a. Typical slots are approximately 6 inches long (high), and approximately one-half inch wide. In a preferred arrangement, the wide, one-half inch, slots are used and adjustable cover plates as illustrated in FIG. 3c are provided thereon. These cover plates may include an arcuate base 93 which conforms to the curvature of, and is secured to, the wall 86 by means of bolts or the like, and an inclined tab 94. A typical angle $\theta$ for the tab 94 is 60°. The cover plates 92 are adjustable as illustrated in FIG. 3c to enable selection of effective slot openings. In an exemplary unit involving a screening structure 51 of approximately twelve inches in diameter and a distributor 53 of slightly less diameter an effective opening of one-eighth inch wide resulted in an influent flow angle $\phi$ of 30° and a screen cage rotation of 120 rpm, an effective opening of three-sixteenths inch wide resulted in an influent flow angle $\phi$ of 45° and a screen cage rotation of 105 rpm, and effective opening of one-fourth inch wide resulted in an influent flow angle $\phi$ of 60° and a screen cage rotation of approximately 80 rpm. The former (one-eighth inch opening) resulted in a better split (a 3-4 percent concentrate which means that for 100 gallons of influent there resulted 3 to 4 gallons concentrate out and 96 to 97 gallons effluent out). When deflector lip 94 almost closes the opening 90 the effluent angle $\phi$ is substantially at the included angle (90°-$\phi$) of the deflector 94; whereas, with the effective opening larger, larger effluent flow angles (more radial flow) occur apparently because some of the effluent effectively comes out of the openings 90 in a radial direction. Alternatively, a flat plate 96 can be used as shown in FIG. 3e for the adjustable cover plate, with the plate shimmed outwardly with a washing 97 or the like from the outer wall 86 to obtain a suitable flow characteristic. In this case, the plate covers the slot but is spaced (e.g., one-eighth inch) therefrom to provide a tangential opening (e.g., one-eighth inch). Several test results will be given later for different slot openings.

Turning now to the effluent and concentrate discharge structure, an interior wall or divider 100, which is substantially cylindrical, is secured within the housing and extends almost to the horizontal surface of the flange of the angle ring 76. This divider forms, in combination with the housing wall 61, an annular chamber 101 for receiving effluent and directing the same to the effluent outlet 55. The effluent, as is known to those skilled in the art, is the material which passes through the screen panels of the screen cage 51. The divider 100 also encloses a concentrate chamber, or bowl, 102 which has an inclined bottom 103 for directing concentrate to the concentrate outlet 56.

Screen cleaning is achieved by means of fluid supply pipes 106 and 107 each having respective groups of nozzles 108 and 109. The nozzles provide sprays of cleaning fluid through the screen panels. It is desired to clean the screens before they become dirty which can be measured in terms of degradation of the split, for example, down to 85-to-15. One of the principal objectives is to achieve a high split, that is, ratio of effluent (screened product) to concentrate (unscreened product), while still obtaining a slightly fluid concentrate which preferably can flow continuously from the apparatus and be supplied, as by pumping, to subsequent treatment equipment without the problems involved in handling a very dry solids concentrate. A typical ratio is better than 85-to-15 with apparatus as described herein, and splits of up to approximately 97 to 3 have been obtained with several hundred gallons per minute influent flow. A number of factors affect this split, one of the principal factors being the centrifugal force (g-loading as noted previously) involved in the screening operation, which varies as the square of the screen cage rpm and as a direct function of the radius thereof. There is a band of optimum performance in terms of centrifugal force. It has been found that a centrifugal force of around 3 g's appears to be optimum in achieving the maximum split, although it is to be understood that the force can be below or above this value somewhat by several g's, even up to approximately 6 to 10 g's and above. However, g forces above about 10 g's usually result in premature screen blinding because the forces involved tend to make solid particles cling to the inner surface of the screens, unless a high pressure cold water backspray is used. Screen failure appears to be related to film thickness (of influent) on the screen and the ultimate pressure involved; and, fine mesh screening material can take higher g forces than coarse mesh because of such film thickness. Examples of what appear to be optimum performance characteristics for separators having screen cage diameters of approximately 60 inches, 30 inches; and 12 inches are as follows: 60 inches — 55 rpm, 14.4 feet per second screen cage velocity, and 2.5 g's; 30 inches — 100 rpm, 13.1 feet per second screen cage volocity, and 4.5 g's; and 12 inch—227 rpm, 12.9 feet per second screen cage velocity, and 8 g's. Optimum performance appears to be a function of the pressure on the screen which in turn is a function of centrifugal force and thickness of the liquid film. For optimum performance with finer mesh screening material a higher g force is desirable as is a backspray of, for example, 80-90 psi. Also, as with the arrangement of FIG. 1, a motor and drive assembly can be coupled with the screen cage to enable the speed of the screen cage to be maintained at a desired value. A further discussion of other factors which effect the split may be found in said U.S. Pat. No. 3,707,235.

Additionally, screening apparatus according to the present invention may include a distributor such as 53 shown in FIG. 2 in place of the upper inclined plate or flighted type distributor described and illustrated in said U.S. Pat. No. 3,707,235. In this case the influent can be suitably divided to flow through an upper distributor like 53 toward the inner surface of the upper portion of the screening structure, and with a portion of the influent being divided and deflected onto a flighted distributor, below the upper distributor 53, such as the lower distributor used in said U.S. Pat. No. 3,707,235 and thereby fed toward the inner lower surface of the lower portion of the rotary screening structure. This arrangement also has the beneficial effect that the flows of influent from the flighted distributor aid in providing a wiping and cleaning action in cleaning the inner surface of the screening structure in a manner similar to that described above in reference to Mook U.S. Pat. No. 3,743,094.

Turning again to the screen cage, and particularly to FIG. 4, preferably the screen panels 82 and 83 are square and arranged in upper and lower rows as shown. It is also desirable that they be removable for repair or replacement and can be readily locked in place in the screen cage. Channels for receiving the side edges of the screen panels 82 and 83 are provided by T-brackets 112 which are secured to the bars 78 by threaded studs 113 and 114 and respective wingnuts 115 and 116. Braces 118 are secured between adjacent ribs 80 and a gasket 119 is fixed onto each brace 118 to form a seal with the top of each respective upper screen panel 82. The side edges of the frame of each screen panel which abut with the bars 78 may have a bead of resilient material thereon to form a seal between the screen panels and bars 78. A similar bead of material can be used between the lower edge of the frame of panel 82 and the upper edge of the frame of panel 83. Each panel includes an angle frame 120 and the screen fabric 121 may be secured thereto with an epoxy adhesive. An exemplary screen fabric is 165 TBC providing 47 percent open area, and tests are noted below using 325 and 500 mesh screens. Metal or synthetic fabrics can be used. When synthetic fabrics are used, they should be backed up by a suitable mesh metal screen, such as 165 TBC drum-tight stainless steel for best performance.

Set forth below in Table I are several early test results for apparatus similar to that illustrated in FIG. 2 having a 12-inch diameter screen cage but with only one row of screen panels and with different size effective openings for the slots 90.

The present embodiments of this invention are to be considered in all respects as illustrative and not restrictive, the scope of the invention being indicated by the appended claims rather than by the foregoing description, and all changes which come within the meaning and range of equivalency of the claims therefore are intended to be embraced therein.

What is claimed is:

1. Screen apparatus comprising
substantially cylindrical screening means for screening an influent applied thereto,
support means for supporting said screening means for rotation substantially about the axis of said screening means,
stationary distributor means disposed in said screening means for receiving influent and providing at least a stream of influent toward the inner surface of said screening means, said stationary distributor means imparting a velocity component to at least one said stream of influent which is tangential relative to said substantially cylindrical screening means in the direction of rotation of said substantially cylindrical screening means, said tangential velocity component providing the sole means for rotating said screening means said distributor means includes a peripheral wall, a top and a bottom thereby defining a substantially cylindrical enclosure, said peripheral wall being close to the inner surface of said screening means and having associated therewith the means for imparting the velocity component, and
feed means for supplying influent into said distributor means.

2. Screen apparatus comprising
substantially cylindrical screening means for screening an influent applied thereto,
support means for supporting said screening means for rotation substantially about the axis of said screening means,
stationary distributor means disposed in said screening means for receiving influent and providing at least a stream of influent toward the inner surface of said screening means, said stationery distrubutor means imparting a velocity component to at least one said stream of influent which is tangential relative to said substantially cylindrical screening means in the direction of rotation of said substantially cylindrical screening means, said tangential

TABLE I

| Test No. | GPM Total Flow | GPM Concentrate | % Concentrate | RPM | Other Conditions |
|---|---|---|---|---|---|
| 1 | 47 | 20 | 42.5 | 34 | ⅛" opening |
| 2 | 179 | 4.9 | 2.7 | 150 | ⅛" opening |
| 3 | 229 | 6.1 | 2.7 | 180 | ⅛" opening; slight binding |
| 4 | 287 | 10.7 | 3.7 | too fast to measure | ⅛" opening |
| 5 | 47 | 15.0 | 32.0 | 28 | wider opening 3/16" |
| 6 | 179 | 5.1 | 2.8 | 103 | 3/16" opening |
| 7 | 248 | 7.5 | 3.0 | 164 | 3/16" opening |
| 8 | 308 | 23 | 7.5 | 193 | 3/16" opening | velocity component providing the sole means for rotating said screening means, said distributor has an inner wall and an outer substantially cylindrical wall with said outer wall being a peripheral wall and having a plurality of slots therein for providing a plurality of streams of influent toward the inner surface of said screening means, each of said slots including a deflection means associated therewith for imparting to each respective stream the velocity component which is tangential to said substantially cylindrical screening means, and feed means for supplying influent into said distributor means.

3. Screening apparatus comprising substantially cylindrical screening means for screening an influent applied thereto, support means for supporting said screening means for rotation substantially about the axis of said screening means, stationary distributor means disposed in said screening means for receiving influent and providing at least a stream of influent toward the inner surface of said screening means, said distributor means having walls defining a substantially cylindrical enclosure with the peripheral wall thereof being close to the inner surface of said screening means and having at least a slot therein for supplying a stream of influent toward said screening means, means associated with said slot for imparting a velocity component to said stream of influent which is tangential relative to said substantially cylindrical screening means to effect rotation of said substantially cylindrical screening means, said tangential velocity components providing the sole means for rotating said screening means, and feed means for supplying influent into said distributor means.

4. A screen apparatus comprising support means, screen means for screening an influent to derive a concentrate and an effluent, said screen means comprising a substantially cylindrical screen structure rotatably supported about the axis of said screen means on said support means, said screen means being free to rotate, stationary distributor means disposed in said screen means for receiving influent and providing a plurality of streams of influent toward the inner surface of said screen means, said distributor means including a substantially enclosed container having a plurality of slots through a peripheral wall thereof for supplying said streams of influent means associated with said peripheral wall to direct said streams of influent to impact said screen means with a tangential velocity component which acts to rotate said screen means, said tangential velocity components providing the sole means for rotating said screening means, and feed means for supplying influent into said distributor means.

* * * * *